United States Patent [19]

Breitenfellner et al.

[11] Patent Number: 4,546,126

[45] Date of Patent: Oct. 8, 1985

[54] FLAME-RETARDING, REINFORCED MOULDING MATERIAL BASED ON THERMOPLASTIC POLYESTERS AND THE USE THEREOF

[75] Inventors: Franz Breitenfellner, Bensheim; Thomas Kainmülle, Lindenfels/Odenwald, both of Fed. Rep. of Germany

[73] Assignee: Ciba Geigy Corporation, Ardsley, N.Y.

[21] Appl. No.: 627,992

[22] Filed: Jul. 5, 1984

[30] Foreign Application Priority Data

Jul. 13, 1983 [CH] Switzerland ............... 3842/83

[51] Int. Cl.$^4$ ............... C08K 94/04; C08K 5/09; C08K 67/02
[52] U.S. Cl. ............... 523/216; 524/94; 524/371; 524/394; 524/605; 524/412; 524/445; 524/513
[58] Field of Search ............... 524/394, 605, 371, 94; 523/216

[56] References Cited

U.S. PATENT DOCUMENTS

| | | | |
|---|---|---|---|
| 3,516,957 | 6/1970 | Gray | 524/394 |
| 3,751,396 | 8/1973 | Gall . | |
| 3,963,669 | 6/1976 | Wurmb et al. . | |
| 4,097,421 | 6/1978 | Chang | 524/394 |
| 4,327,007 | 4/1982 | Vanderkooi | 524/394 |
| 4,344,874 | 8/1982 | Akagi | 524/394 |
| 4,351,751 | 9/1982 | Kishida | 524/394 |
| 4,460,729 | 7/1984 | Books | 524/394 |

FOREIGN PATENT DOCUMENTS

| | | | |
|---|---|---|---|
| 757093 | 4/1971 | Belgium | 524/394 |
| 2322900 | 4/1977 | France . | |
| 0127756 | 7/1983 | Japan | 524/394 |
| 1422607 | 1/1976 | United Kingdom . | |

*Primary Examiner*—C. Warren Ivy
*Attorney, Agent, or Firm*—Luther A. R. Hall

[57] ABSTRACT

The tendency to drip of the melt formed from reinforced moulding materials based on thermoplastic polyesters, provided with a flame-retarding finish, when the latter are subjected to an open flame can be prevented by adding phyllosilicates, and the reduction in the toughness properties thereby caused can be prevented by adding alkali metal salts of aliphatic $C_{6-22}$ monocarboxylic acids.

11 Claims, No Drawings

FLAME-RETARDING, REINFORCED MOULDING MATERIAL BASED ON THERMOPLASTIC POLYESTERS AND THE USE THEREOF

The present invention relates to reinforced, thermoplastic polyester moulding materials provided with a flame-retarding finish and to their use for the production of shaped articles.

Thermoplastic polyesters provided with a flame-retarding finish and additionally reinforced are mainly employed in the field of electrical engineering and electronics. Polyester moulding materials of this type have a considerable tendency to form molten, and in some cases burning, drops when subjected to combustion and thus frequently do not meet the safety specifications set for such materials and can therefore only be used to a limited extent.

It is known that, for example, certain gelling agents, such as finely divided silicates (German Auslegeschrift No. 2,408,531 and French Patent Specification No. 2,322,900), silica derivatives (German Offenlegungsschrift No. 2,226,931) or fillers having a length/diameter ratio greater than 50 (German Auslegeschrift No. 2,158,432) can be used to suppress the formation of drops by the melt formed under the action of an open flame from reinforced, flame-retarding moulding materials. Examples of such additives are kaolin, talc, bentonites and montmorillonites which can be modified by organic compounds, glass beads, surface-active silica, oligomeric sodium silicate, asbestos, graphite fibres, glass fibres, silicon carbide, diatomaceous earth and the like. These anti-drip agents are disadvantageous insofar as they cause a considerable reduction in the toughness properties of the resulting reinforced moulding materials, provided with a flame-retarding finish, as a result of which the properties of the latter in use are impaired.

The invention relates to a flame-retarding, reinforced polyester moulding material which contains
(a) a thermoplastic polyester,
(b) 3 to 50% by weight of a reinforcing filler,
(c) 5 to 30% by weight of a flame-retarding additive and
(d) 0.2 to 4.0% by weight of a phyllosilicate which may be modified with organic compounds, and which additionally contains
(e) 0.05 to 2.0% by weight of an alkali metal salt of an aliphatic monocarboxylic acid having 6–22 C atoms, the percentages by weight relating to the total weight of the moulding material.

The moulding materials according to the invention are distinguished by good toughness properties, without their anti-drip and flame-retarding properties being impaired thereby. In addition, the components (e) are effective even at low to very low added quantities.

The components (b) to (e) used can in each case be single-substance compounds or materials or mixtures of different compounds or materials.

Linear thermoplastic polyesters suitable for the moulding materials according to the invention are preferably crystalline or partly crystalline and in this event have, in particular, melting points of at least 150° C. They can, however, also be in an amorphous form, and the polyester then preferably has a glass transition temperature of at least 70° C., especially at least 100° C. The viscosity number (as specified in DIN 53,728/3) of the polyesters is preferably at least 69 (cm$^3$/g), especially at least 98 (cm$^3$/g).

The polyesters can be homopolyesters or copolyesters. Examples of monomers which can be used for these polyesters are linear or branched, saturated aliphatic or cycloaliphatic, aromatic or heterocyclic dicarboxylic acids or esters thereof, corresponding diols or corresponding hydroxycarboxylic acids. Furthermore mixtures of these polyesters are also suitable. Their composition depends essentially on the properties desired for a specific end use.

The aliphatic dicarboxylic acids can contain 2 to 40 C atoms, the cycloaliphatic dicarboxylic acids 6 to 10 C atoms, the aromatic dicarboxylic acids 8 to 14 C atoms the heterocyclic dicarboxylic acids 5 to 12 C atoms, the aliphatic hydroxycarboxylic acids 2 to 12 C atoms and the aromatic and cycloaliphatic hydroxycarboxylic acids 7 to 13 C atoms and the heterocyclic hydroxycarboxylic acids 5 to 11 C atoms.

The aliphatic diols can contain 2 to 12 C atoms, the cycloaliphatic diols 5 to 8 C atoms, the aromatic diols 6 to 16 C atoms and the heterocyclic diols 3 to 16 C atoms.

Aromatic diols or dicarboxylic acids which are indicated are those in which two hydroxyl or carboxyl groups, respectively, are attached to an aromatic hydrocarbon radical or to different aromatic hydrocarbon radicals.

It is also possible for the polyesters to be crosslinked with small amounts, for example 0.1 to 3 mole %, based on the dicarboxylic acids present, of a monomer containing more than two carboxyl and/or hydroxyl groups (for example pentaerythritol or trimellitic acid).

In the case of polyesters formed from at least 3 different monomers, the latter can be statistically distributed, or the polyesters can be block polymers.

Examples of possible aliphatic dicarboxylic acids having 2 to 40 C atoms are oxalic acid, malonic acid, dimethylmalonic acid, succinic acid, octadecylsuccinic acid, pimelic acid, adipic acid, trimethyladipic acid, sebacic acid, azelaic acid and dimeric acid (dimerisation products of unsaturated, aliphatic carboxylic acids, such as oleic acid).

The following are possible cycloaliphatic dicarboxylic acids: 1,3-cyclobutanedicarboxylic acid, 1,3-cyclopentanedicarboxylic acid, 1,3-cyclohexanedicarboxylic and 1,4-cyclohexanedicarboxylic acid, 1,3-methylcyclohexanedicarboxylic and 1,4-methylcyclohexanedicarboxylic acid and 4,4'-dicyclohexyldicarboxylic acid.

The following are possible suitable aromatic dicarboxylic acids: terephthalic acid, isophthalic acid, phthalic acid, 1,3-, 1,4-, 2,6- or 2,7-naphthalenedicarboxylic acid, 4,4'-biphenyldicarboxylic acid, 4,4'-diphenylsulfonedicarboxylic acid, 1,1,3-trimethyl-5-carboxyl-3-(p-carboxyphenyl)indane, 4,4'-diphenyletherdicarboxylic acid and 4,4'-diphenylmethanedicarboxylic acid. The aromatic dicarboxylic acids are preferred, and amongst them particularly terephthalic acid, isophthalic acid and phthalic acid.

Further suitable dicarboxylic acids are those containing —CO—NH— groups, such as are described, for example, in German Offenlegungsschrift No. 2,414,349. Dicarboxylic acids containing N-heterocyclic rings are also suitable, for example those derived from carboxyalkylated, carboxyphenylated or carboxybenzylated monoamino-s-triazinedicarboxylic acids (cf. German Offenlegungsschriften Nos. 2,121,184 and 2,533,675), monohydantoins or bishydantoins, benzimidazolones which can be halogenated or parabanic acid. In these compounds, the carboxyalkyl group can contain 3 to 30 C atoms.

Suitable aliphatic diols can be linear or branched and preferably contain 2 to 12, in particular 2 to 6, carbon atoms, for example: ethylene glycol, 1,2-propylene glycol, 1,3-propylene glycol, 1,2-, 1,3-, 2,3- or 1,4-butanediol, pentylglycol, neopentylglycol, 1,6-hexanediol or 1,12-dodecanediol. An example of a suitable cycloaliphatic diol is 1,4-dihydroxycyclohexane. Examples of further suitable diols are 1,4-bis-(hydroxymethyl)-cyclohexane, aromatic-aliphatic diols, such as p-dihydroxymethylbenzene or 2,5-dichloro-p-dihydroxymethylbenzene, and polyoxaalkylene glycols, such as diethylene glycol, triethylene glycol or polyethylene glycols. The alkylenediols are preferably linear and contain, in particular, 2 to 4 carbon atoms.

Preferred diols are the alkylenediols, 1,4-dihydroxycyclohexane and 1,4-bis-(hydroxymethyl)-cyclohexane. Ethylene glycol and 1,4-butanediol are particularly preferred.

Further suitable diols are the β-hydroxyalkylated, especially β-hydroxyethylated, bisphenols, such as 2,2-bis-[4'-(β-hydroxyethoxy)-phenyl]-propane. Further bisphenols are mentioned later.

A further group of suitable diols is formed by the heterocyclic diols described in German Offenlegungsschriften Nos. 1,812,003, 2,342,432, 2,342,372 and 2,453,325. The following are examples: N,N'-bis-(β-hydroxyethyl)-5,5-dimethylhydantoin, N,N'-bis-(β-hydroxypropyl)-5,5-dimethylhydantoin, methylene-bis-[N-(β-hydroxyethyl)-5-methyl-5-ethylhydantoin], methylene-bis-[N-(β-hydroxyethyl)-5,5-dimethylhydantoin], N,N'-bis-(β-hydroxyethyl)-benzimidazolone, N,N'-bis-(β-hydroxyethyl)-tetrachlorobenzimidazolone or N,N'-bis-(β-hydroxyethyl)-tetrabromobenzimidazolone.

Suitable aromatic diols are mononuclear diphenols and particularly dinuclear diphenols carrying a hydroxyl group on each aromatic nucleus. Aromatic radicals are understood to mean preferably hydrocarbon-aromatic radicals, for example phenylene or naphthylene. In addition to, for example, hydroquinone and resorcinol, special mention should be made of the bisphenols which can be represented by formula I below

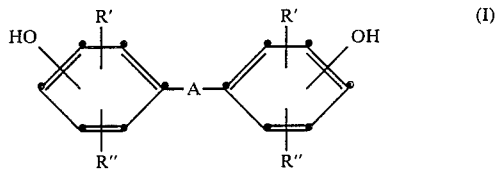

(I)

The hydroxyl groups can be located in the m-position, but particularly in the p-position, and R' and R'' in this formula can be alkyl having 1 to 6 C atoms, halogen, such as chlorine or bromine, and especially hydrogen atoms. A can be a direct bond or can be O, S, $SO_2$ or alkylidene, cycloalkylidene, or alkylene which is unsubstituted or substituted by halogen, phenyl or alkylphenyl, preferably having 1 or 2 C atoms in the alkyl.

The following are examples of substituted or unsubstituted alkylidene: ethylidene, 1,1-propylidene, 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, 1,2-propylene, phenylmethylene, diphenylmethylene and methylphenylmethylene. Examples of cycloalkylidene are cyclopentylidene, cyclohexylidene, cycloheptylidene and cyclooctylidene. The alkylidene, cycloalkylidene or alkylene groups A are preferably unsubstituted.

The following are examples of bisphenols: bis-(p-hydroxyphenyl) ether or thioether, bis-(p-hydroxyphenyl) sulfone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxy-3'-methylphenyl)-propane, 1,1-bis-(p-hydroxyphenyl)-butane, 2,2-bis-(p-hydroxyphenyl)-butane, 1,1-dichloro-2,2-bis-(p-hydroxyphenyl)-ethane, 1,1,1-trichloro-2,2-bis-(p-hydroxyphenyl)-ethane, 1,1-bis-(p-hydroxyphenyl)-cyclopentane and, in particular, 2,2-bis-(p-hydroxyphenyl)-propane (bisphenol A) and 1,1-bis-(p-hydroxyphenyl)-cyclohexane (bisphenol C).

Examples of suitable polyesters formed from hydroxycarboxylic acids are polycaprolactone, polypivalolactone or the polyesters formed from 4-hydroxycyclohexanecarboxylic acid or 4-hydroxybenzoic acid.

Linear polyesters derived from aromatic dicarboxylic acids have acquired the greatest importance, in particular the polyalkylene terephthalates. Preferred moulding materials according to the invention are, therefore, those in which the polyester is composed of at least 30 mole %, preferably at least 40 mole %, of aromatic dicarboxylic acids and at least 30 mole %, preferably at least 40 mole %, of alkylenediols having preferably 2 to 12 C atoms, based on the polyester.

In this event, the alkylenediol is, in particular, linear and contains 2 to 6 C atoms, for example ethyleneglycol, trimethylene glycol, tetramethylene glycol or hexamethylene glycol, and the aromatic dicarboxylic acid is terephthalic and/or isophthalic acid. Polyethylene terephthalate and poly-1,4-butylene terephthalate and also copolyesters based on polyethylene terephthalate and poly-1,4-butylene terephthalate are particularly preferred as polyesters. Poly-1,4-butylene terephthalate (PBTP) is very particularly preferred.

The moulding material according to the definition preferably contains the reinforcing filler in the form of fibres, for example asbestos fibres, carbon fibres or, in particular, glass fibres. The fillers can be coated with an adhesion promoter in order to improve their attachment to the polyester. The amount of reinforcing filler is preferably 10 to 50% by weight, particularly preferably 10 to 40% by weight and very particularly preferably 25 to 35% by weight, based on the total material.

The moulding material according to the definition contains, in particular, 10 to 20% by weight, based on the total material, of a flame-retarding additive.

Examples of suitable flame-retarding additives are organic halogen compounds, especially chlorine or bromine compounds, which are used on their own or together with compounds, having a synergistic action, containing elements of the fifth main group of the periodic system, especially phosphorus and antimony compounds and particularly antimony trioxide.

Flame-retarding agents based on organic chlorine-containing and/or especially bromine-containing compounds are known. They can in this case be those which are incorporated in the plastic as a co-component or those which are copolymerised as reactive monomers into the polymer molecules. Examples of the latter are tetrachlorophthalic anhydride, dichloroterephthalic acid or lower alkyl esters thereof, tetrabromophthalic anhydride, tetrabromobisphenol A, N,N'-bis-(β-hydroxyethyl)-tetrachlorobenzimidazolone or N,N'-bis-(β-hydroxyethyl)-tetrabromobenzimidazolone.

The following are further examples of chlorine-containing and/or bromine-containing compounds: brominated polystyrenes, for example polytribromostyrene, polypentabromostyrene, decabromobiphenyl, tetrabromobiphenyl, hexabromodiphenyl ether, octabromodiphenyl ether, decabromodiphenyl ether, tetrabromodiphenyl sulfide, hexabromodiphenyl sulfone, 3-(2',4',6'-tribromophenoxy)-1,2-propanediol, dibromophthalic or tetrabromophthalic acid and anhydrides thereof, dibromoterephthalic acid, hydroxyethylated dibromobisphenol A, hydroxyethylated tetrabromobisphenol A, tetrabromo-1,4-bis-(hydroxymethyl)-benzene, tetrabromobenzimidazolone, N,N'-ethylene-bis-tetrabromophthalimide and the analogous chlorine compounds. Further organic halogen compounds are described, for example, in German Offenlegungsschrift No. 2,242,450.

The preferred flame-retarding agent is a combination of antimony trioxide with brominated polystyrene or with N,N'-ethylene-bis-tetrabromophthalimide and particularly preferably with decabromodiphenyl ether.

The phyllosilicate anti-drip agent used in accordance with the invention can be a smectite, in particular a bentonite or a montmorillonite. It is also possible to employ smectites modified with organic compounds, in particular with organic ammonium salts, in which the organic radicals can be, for example, phenyl, benzyl or alkyl groups. Ammonium salts containing at least one long-chain alkyl group, in particular tetraalkylammonium salts containing one or two alkyl groups having, for example, 10 to 25 C atoms, in particular having 16 to 20 C atoms, are preferred. Preferred products of this type are known under the tradenames Claytone ® (China-Clay Handelsgesellschaft, Düsseldorf, West Germany) or Bentone ® (NL Chemicals, Wilmslow, U.K.). It is preferable to employ Claytone ® 34 or 40 (both dimethyldioctadecylammonium-bentonite) or Bentone ® 27, 34 (dimethyldioctadecylammonium-montmorillonite), 38, 500 or SD-1, Bentone ® 500 and Bentone ® SD-1 being particularly preferred.

The phyllosilicates are preferably employed in a total amount of 0.75 to 2.0% by weight, based on the total material.

The alkali metal salts (e) present in the moulding materials according to the invention are, in particular, sodium or potassium salts of saturated or unsaturated aliphatic monocarboxylic acids having 10 to 20 C atoms, preferably 14 to 18 C atoms. Preferred alkali metal salts are potassium and/or sodium stearate and potassium and/or sodium oleate, especially potassium oleate. The component (e) is preferably present in a total amount of 0.05 to 1% by weight, in particular 0.1 to 0.6% by weight, based on the total material.

The thermoplastic polyesters are known and commercially available, or they can be prepared by known polycondensation processes of the art.

The preparation of the moulding materials according to the invention is also effected in accordance with methods customary in the art by incorporating the additives into the thermoplastic polyesters, for example by re-granulation. It is also possible to apply the phyllosilicate and the alkali metal salt to the polyester granules by tumbling.

It is also possible to add further customary additives, for example further fillers, for example talc, mica, metal powders, silica aerosol, kaolin, calcium carbonate, dolomite, magnesium sulfate, silicates or glass beads, inorganic or organic pigments, fluorescent brighteners, delustering agents, lubricants, mould release assistants, crystallisation-promoting agents, antioxidants, light stabilisers and processing stabilisers.

In the moulding materials according to the invention, dripping of the melt when subjected to a flame is effectively prevented. Furthermore, because of the addition of the alkali metal salts of aliphatic $C_{6-22}$ monocarboxylic acids, the good toughness properties of the moulding materials are substantially retained. Incorporating the additives presents no problems, and a uniform distribution in the moulding material is achieved.

The moulding materials can be processed by customary shaping processes, such as casting, compression moulding, injection moulding and extrusion to give consumer articles of all types. Examples of such articles are industrial components, casings for equipment, household appliances, sports equipment, electrical insulation, automobile components, circuitry, sheets, films and semi-finished goods which can be shaped by machining. A particular field of application is the production of shaped articles or casings for electrical engineering and electronics.

The examples which follow illustrate the invention in greater detail. The % by weight amounts of the individual components indicated in the examples are always based on the total material.

EXAMPLES 1-9

The components listed in Table 1 are incorporated into polybutylene terephthalate (viscosity number as specified in DIN 53,728/3 102 cm$^3$/g) at 250° C. by means of a laboratory Ko-kneader, and the moulding material is granulated. After the granules have dried, they are processed to give shaped articles by injection moulding (125 × 12.5 × 1.6 mm for testing flammability and 6 × 4 × 50 mm for testing impact strength) under the following conditions:
Cylinder temperature: 250° C.
Mould temperature: 80° C.
Cycle time: 45 seconds.

EXAMPLES 10-12

The four components listed first in Table 1 (PBTP, glass fibres, flame-retarding agent and $Sb_2O_3$) are processed by means of a laboratory Ko-kneader to give a moulding material, and the moulding material is granulated. After the granules have dried, the last two components (phyllosilicate and alkali metal salt) are applied by tumbling in a gyratory mixer, and injection-moulded articles are then produced as described above.

The flammability of the shaped articles is determined as specified in UL 94 and the impact strength as specified in DIN 53,453. In the flammability test, the shaped articles prove to be self-extinguishing V-O and non-dripping. In the impact test, the test specimens prove to have a high impact strength, the impact strength varying according to the nature and amount of the phyllosilicate (d) and the alkali metal salt (e).

TABLE 1

| Example No. | Composition | Flammability UL-94 (sample 1.6 mm thick) | Impact strength DIN 53 453 (kJ/m$^2$) |
|---|---|---|---|
| 1 | 55.0% by weight of PBTP[1]<br>30.0% by weight of glass fibres<br>9.0% by weight of decabromodiphenyl ether<br>4.5% by weight of Sb$_2$O$_3$<br>1.0% by weight of Claytone ® 34<br>0.5% by weight of potassium oleate | V-O<br>non-dripping | 25.9 |
| 2 | 55.3% by weight of PBTP[1]<br>30.0% by weight of glass fibres<br>9.0% by weight of decabromodiphenyl ether<br>4.5% by weight of Sb$_2$O$_3$<br>1.0% by weight of Claytone ® 40<br>0.2% by weight of potassium oleate | V-O<br>non-dripping | 25.4 |
| 3 | 55.1% by weight of PBTP[1]<br>30.0% by weight of glass fibres<br>9.0% by weight of decabromodiphenyl ether<br>4.5% by weight of Sb$_2$O$_3$<br>1.0% by weight of Claytone ® 40<br>0.4% by weight of potassium oleate | V-O<br>non-dripping | 25.8 |
| 4 | 54.7% by weight of PBTP[1]<br>30.0% by weight of glass fibres<br>9.0% by weight of decabromodiphenyl ether<br>4.5% by weight of Sb$_2$O$_3$<br>1.0% by weight of Claytone ® 40<br>0.8% by weight of potassium oleate | V-O<br>non-dripping | 20.3 |
| 5 | 55.0% by weight of PBTP[1]<br>30.0% by weight of glass fibres<br>9.0% by weight of decabromodiphenyl ether<br>4.5% by weight of Sb$_2$O$_3$<br>1.0% by weight of Claytone ® 40<br>0.5% by weight of sodium oleate | V-O<br>non-dripping | 20.9 |
| 6 | 53.5% by weight of PBTP[1]<br>30.0% by weight of glass fibres<br>9.0% by weight of decabromodiphenyl ether<br>4.5% by weight of Sb$_2$O$_3$<br>2.0% by weight of Claytone ® 40<br>1.0% by weight of potassium oleate | V-O<br>non-dripping | 16.5 |
| 7 | 55.0% by weight of PBTP[1]<br>30.0% by weight of glass fibres<br>9.0% by weight of decabromodiphenyl ether<br>4.5% by weight of Sb$_2$O$_3$<br>1.0% by weight of Bentone ® 27<br>0.5% by weight of potassium oleate | V-O<br>non-dripping | 22.5 |
| 8 | 55.2% by weight of PBTP[1]<br>30.0% by weight of glass fibres<br>9.0% by weight of decabromodiphenyl ether<br>4.5% by weight of Sb$_2$O$_3$<br>1.0% by weight of Bentone ® SD-1<br>0.3% by weight of potassium oleate | V-O<br>non-dripping | 32.2 |
| 9 | 55.2% by weight of PBTP[1]<br>30.0% by weight of glass fibres<br>9.0% by weight of decabromodiphenyl ether<br>4.5% by weight of Sb$_2$O$_3$<br>1.0% by weight of Bentone ® 500<br>0.3% by weight of potassium oleate | V-O<br>non-dripping | 29.9 |
| 10 | 62.5% by weight of PBTP[1]<br>20.0% by weight of glass fibres<br>12.5% by weight of polytribromostyrene<br>5.0% by weight of Sb$_2$O$_3$<br>1.0% by weight of Claytone ® 34<br>0.3% by weight of potassium oleate | V-O<br>non-dripping | 25.4 |
| 11 | 56.5% by weight of PBTP[1]<br>30.0% by weight of glass fibres<br>9.0% by weight of decabromodiphenyl ether<br>4.5% by weight of Sb$_2$O$_3$<br>1.0% by weight of Montmorillonite K 10 (Fluka)<br>0.3% by weight of potassium oleate | V-O<br>non-dripping | 23.1 |
| 12 | 56.5% by weight of PBTP[1]<br>30.0% by weight of glass fibres<br>9.0% by weight of decabromodiphenyl ether<br>4.5% by weight of Sb$_2$O$_3$<br>1.0% by weight of Bentone ® 34 | V-O<br>non-dripping | 21.6 |

TABLE 1-continued

| Example No. | Composition | Flammability UL-94 (sample 1.6 mm thick) | Impact strength DIN 53 453 (kJ/m²) |
|---|---|---|---|
| | 0.5% by weight of sodium stearate | | |

[1] PBTP: poly-1,4-butylene terephthalate
[2] Claytone ® and Bentone ® are registered brand names of the companies "China-Clay Handelsgesellschaft" and "NL Chemicals" respectively.
Claytone ® 40 and Claytone ® 34: dimethyldioctadecylammonium bentonite
Bentone ® 34: dimethyldioctadecylammonium-montmorillonite
Bentone ® SD-1: a smectite modified with organic compounds
Bentone ® 27 and Bentone ® 500: a montmorillonite modified with organic compounds

What is claimed is:

1. A flame-retarding, reinforced polyester moulding material which contains
   (a) a thermoplastic polyester which is a poly-1,4-butylene terephthalate or a copolyester based on polyethylene terephthalate and poly-1,4-butylene terephthalate,
   (b) 3 to 50% by weight of a reinforcing filler,
   (c) 5 to 30% by weight of a flame-retarding additive,
   (d) 0.2 to 4.0% by weight of an unmodified phyllosilicate, or of a phyllosilicate modified with an organic ammonium salt, and
   (e) 0.05 to 2.0% by weight of an alkali metal salt of an aliphatic monocarboxylic acid having 6 to 22 C atoms, the percentages by weight being based on the total weight of the moulding material.

2. A moulding material according to claim 1, wherein the polyester is poly-1,4-butylene terephthalate.

3. A moulding material according to claim 1, which contains glass fibres as the reinforcing filler.

4. A moulding material according to claim 1, which contains, as the flame-retarding additive, an organic chlorine or bromine compound on its own or in combination with antimony trioxide.

5. A moulding material according to claim 1, which contains, as the flame-retarding additive, a combination of antimony trioxide with brominated polystyrene, N,N'-ethylene-bis-tetrabromophthalimide or decabromodiphenyl ether.

6. A moulding material according to claim 1, which contains, as the component (d), a smectite.

7. A moulding material according to claim 6, wherein the smectite is a bentonite or montmorillonite modified with an organic ammonium salt compound.

8. A moulding material according to claim 1, which contains, as the component (d), dimethyldioctadecylammonium-bentonite or dimethyldioctadecylammonium-montmorillonite.

9. A molding material according to claim 1, which contains, as the component (e), potassium or sodium stearate or mixture thereof, or potassium or sodium oleate or mixture thereof.

10. A moulding material according to claim 1, which contains, as the component (e), potassium oleate.

11. A moulding material according to claim 1, wherein the proportions of components (b) to (e) independently of one another are: reinforcing filler (b) 10 to 50% by weight; flame-retarding additive (c) 10 to 20% by weight; phyllosilicate (d) 0.75 to 2.0% by weight; and component (e) 0.05 to 1.0% by weight, in each case based on the total weight of the moulding materials.

* * * * *